(12) United States Patent
Jacquet et al.

(10) Patent No.: US 7,668,167 B2
(45) Date of Patent: Feb. 23, 2010

(54) METHOD OF EXCHANGING INFORMATION BETWEEN TWO NETWORKS OPERATING UNDER DIFFERENT ROUTING PROTOCOLS

(75) Inventors: Adeline Jacquet, Paris (FR); Robert Brive, Herouville (FR); Benjamin Declety, Boulogne Billancourt (FR)

(73) Assignee: Sagem Defense Securite, Paris (FR)

( * ) Notice: Subject to any disclaimer, the term of this patent is extended or adjusted under 35 U.S.C. 154(b) by 675 days.

(21) Appl. No.: 11/091,400

(22) Filed: Mar. 29, 2005

(65) Prior Publication Data

US 2010/0014537 A1    Jan. 21, 2010

(30) Foreign Application Priority Data

Mar. 30, 2004    (FR) .................................. 04 03280

(51) Int. Cl.
*H04L 12/56*    (2006.01)

(52) U.S. Cl. ..................................................... 370/392
(58) Field of Classification Search ................. 370/392, 370/352; 379/230, 229, 220.01; 455/414.1
See application file for complete search history.

(56) References Cited

U.S. PATENT DOCUMENTS

| | | | |
|---|---|---|---|
| 6,757,712 B1 * | 6/2004 | Bastian et al. ............... | 709/206 |
| 7,298,743 B2 * | 11/2007 | Markki et al. ................ | 370/392 |
| 7,308,715 B2 * | 12/2007 | Gupta et al. ................... | 726/23 |
| 7,447,735 B2 * | 11/2008 | Khawand et al. ............ | 709/203 |

OTHER PUBLICATIONS

Doyle, Cisco Press, 1998, pp. 1,II, 546-547, 550, 551, 696, 697, 721, 733-736, 772, 773, IP002303836, Indianapolis.
Kim, K-I, et al., IEEE Communications Letters, IEEE Service Center, Piscataway, US, vol. 7, No. 7, Jul. 7, 2003, pp. 340-342, XP001175980.
Bates, T. IETF RFC, Online!, Jan. 31, 1998, pp. 1-12, XP002303904.

* cited by examiner

*Primary Examiner*—Ricky Ngo
*Assistant Examiner*—Chandrahas Patel
(74) *Attorney, Agent, or Firm*—Muncy, Geissler, Olds & Lowe, PLLC

(57) ABSTRACT

A method of exchanging information between a first network implementing a routing protocol using static routing tables and a second network implementing a routing protocol using dynamic routing tables and including stages of exchanging identification messages and of exchanging routing table update messages, the method comprising the steps of: a first routing element associated with the first network issuing to a second routing element associated with the second network identification messages containing identifiers of network elements to which the first routing element knows it is connected either directly or indirectly, and in the second routing element updating the routing table from the identification messages coming from the first routing element.

7 Claims, 1 Drawing Sheet

METHOD OF EXCHANGING INFORMATION BETWEEN TWO NETWORKS OPERATING UNDER DIFFERENT ROUTING PROTOCOLS

BACKGROUND OF THE INVENTION

Networks of a first type are known in which information is routed between different elements of the network by using static routing tables. For each element of the network, a routing table lists the portions of the network that are directly or indirectly connected to the network element in question, together with the interfaces of said network element giving access to these various portions of the network. A routing table is said to be static when any change to the network assumes that a corresponding change will be made by an operator to the routing tables of the network elements.

Networks of a second type are known in which information is routed between the various elements of the network by using dynamic routing tables. One such routing protocol is the link state hierarchical routing protocol, known as open shortest path first (OSPF), which constitutes specifically the subject matter of the Internet Engineering Task Force (IETF) technical report RFC 2328. This type of routing protocol provides for a state in which identification messages and routing table update messages are interchanged. Each identification message includes a neighborhood identification field normally dedicated to receiving the identifiers of neighboring network elements that are connected directly to the network element issuing the identification message, and serving to inform the neighboring network elements that the emitting network element is active. The update messages contain, in particular, in usual manner, the identifiers of network elements to which the message-emitting network element knows it is connected either directly or indirectly.

There are proposals for installing on-board networks in certain airplanes, comprising an avionics network of the first type that is secure and that is used to operate the airplane, and a public network of the second type that is less secure and that is used by the crew for obtaining information about the flight or the passengers, about the airports used, . . . , and also to enable passengers to have access to entertainment means. The public network is also used by maintenance teams on the ground for obtaining flight parameters after the airplane has landed. The avionics network is connected to the public network via at least two first routing elements selectively associated with the avionics network, and at least one second routing element associated with the public network and connected to the first routing elements.

Ideally, in order to ensure full inter-operability between the two networks, it would be necessary for the first routing element to be capable of implementing the routing protocol on the basis of dynamic tables and of exchanging identification messages and update messages with the second routing element. Nevertheless, such exchanges of information would burden the first routing devices in quite significant manner, particularly since as a general rule such routing devices have computing resources that are relatively limited.

In addition, in order to ensure that the network is reliable, provision is made for the two first routing elements to be connected to the first network in alternation. It is thus essential for the second routing elements to be able to identify which first routing element is active in order to perform effective routing.

OBJECT OF THE INVENTION

An object of the invention is to propose a method of exchanging information between a network using a routing protocol based on static routing tables and a network using a routing protocol based on dynamic routing tables, which method requires only a limited amount of information transfer in order to update the dynamic routing tables while nevertheless enabling information to be routed reliably.

BRIEF SUMMARY OF THE INVENTION

To this end, the invention provides a method of exchanging information between a first network and a second network, each made up of network elements, and connected to each other by at least two first routing elements that are selectively associated with the first network, and by at least one second routing element that is associated with the second network and that is connected to the first routing elements. The first network implements a routing protocol using static routing tables and the second network implements a routing protocol using dynamic routing tables. The method comprises the steps of:

each first routing element issuing to the second routing element identification messages each having a neighborhood identification field containing the identifiers of network elements to which the first routing element knows it is connected directly or indirectly;

in each first routing element, processing the identification messages coming from the second routing element solely as indicating that the second routing element is active; and in the second routing element, updating the routing table from the identification messages coming from the first routing element.

In this case, the identifiers of network elements to which the first routing element knows it is connected the network addresses of said network elements, i.e. the addresses of the portions of the network (or networks) to which said network elements belong.

Thus, the identification messages issued by the first routing element comprise both conventional identification message information and information enabling the routing table of the second routing element to be updated. Because this information, which ought normally to appear in the update messages, is incorporated in the identification messages, there is no longer any need for the update messages. The work load on the first routing element is then relatively small and the volume of information transiting between the first routing elements and the second routing elements is small. The neighborhood identification fields of the identification messages issued by the first routing elements also enable the second routing element to determine which of the two first routing elements is actually connected to the first network.

Advantageously, the second routing element is configured not to issue update messages to the first routing element.

Since update messages are neither issued nor used by the first routing elements that possess respective static routing tables, and possibly default routes for information having the second network as its destination, there is no need for the second routing element to send update messages to the first routing element, thereby making it possible to further reduce the work load on the first routing element and the volume of information exchanged over the link between the first routing element and the second routing element.

BRIEF DESCRIPTION OF THE DRAWINGS

Other characteristics and advantages of the invention appear on reading the following description of a particular, non-limiting implementation of the invention.

Reference is made to the sole accompanying FIGURE which is a diagram of a network implementing the method in accordance with the invention.

DETAILED DESCRIPTION OF THE INVENTION

Figure 1:
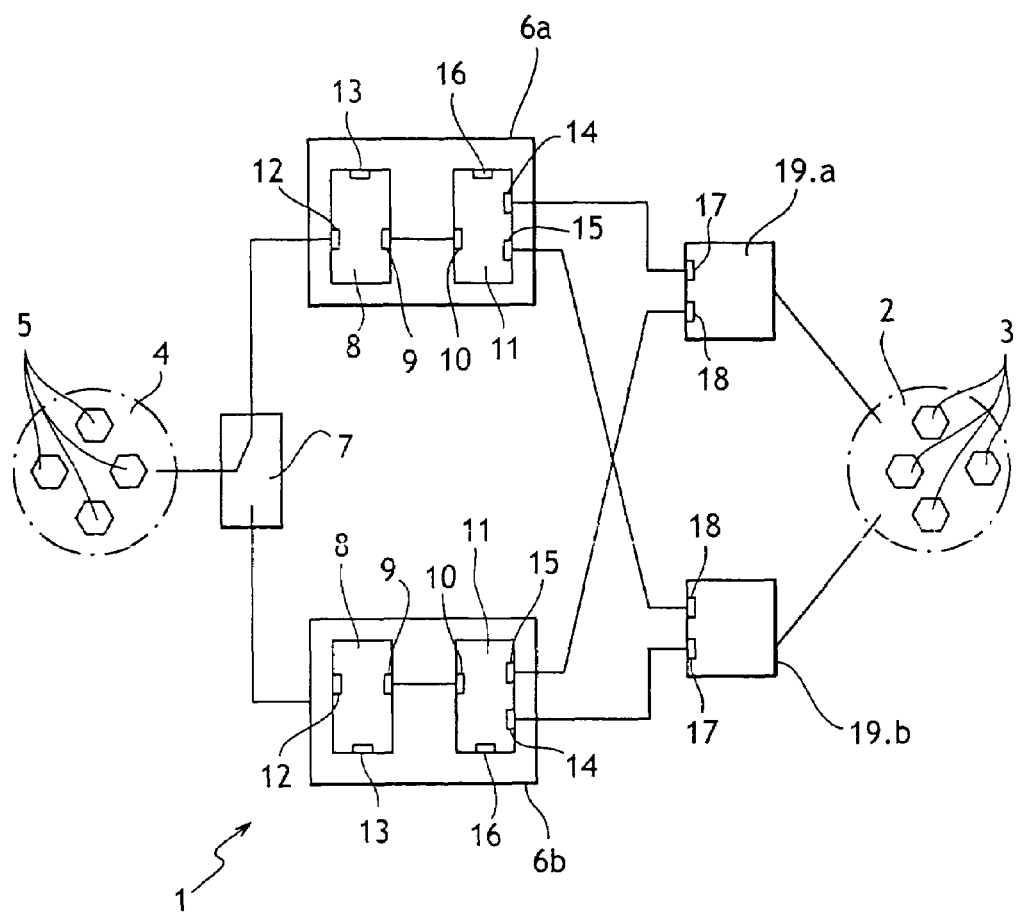

With reference to the FIGURE, the method of the invention is described below as applied to a network given overall reference 1 and located on board an aircraft, for example.

The network 1 comprises a network 2 having network elements 3 such as servers or other computer devices, and a network 4 comprising network elements 5 such as servers or other computer devices. In this case, the network 2 is a public network used by the crew to obtain information concerning the flight, the passengers, the airports visited, . . . , and also to give passengers access to entertainment means. In this case the network 4 is used to operate the airplane itself. The network 4 is a highly secure network, while the network 2 is a less secure network.

Two protection and routing elements 6a and 6b are connected to the network 1 via a selector device 7.

Each protection and routing device 6 is itself known and comprises a router 8 with an internal interface 9 connected to an internal interface 10 of a demilitarized zone (DMZ) type filter element 11. The router 8 also has an external interface 12 connected to the selector device 7 and an internal interface 13 suitable for use in maintenance operations. The filter element 11 possesses external interfaces 14, 15 and an internal interface 16 suitable for use in maintenance operations.

The external interfaces 14 of the filter elements 11 of the protection and routing devices 6a and 6b are connected to the interfaces 17 of the routing devices 19a and 19b respectively. The external interfaces 15 of the filter elements 11 of the protection and routing devices 6a and 6b are connected to the interfaces 18 of the routing devices 19a and 19b respectively. The links between firstly the protection and routing devices 6a and 6b and secondly the routing devices 19a and 19b respectively are privileged in the routing tables.

The routing devices 19a and 19b are connected to the network 2.

The selector device 7 includes means for switching the link from the network 4 to one or the other of the protection and routing devices 6a, 6b (with the protection and routing device 6a being shown connected to the network 4 in the FIGURE).

The network 4 operates using a routing protocol based on static routing tables. The protection and routing devices 6a and 6b, and likewise the network elements 5 that perform routing functions, thus have memories containing the routing tables that are associated with them respectively. In this case, each routing table has defined routes for reaching network elements 4 and a default route for reaching the network elements 2.

The network 2 operates using a routing protocol based on so-called dynamic routing tables. Each routing table contains routes which associate an outlet interface with a network to be reached (or a network portion or a sub-network) in the form of a network address associated with a network mask. In this case, the routing protocol is the OSPF protocol which provides for the network elements 2 that perform a routing function (including the routing devices 19a and 19b) to exchange:

identification messages each having a neighborhood identification field normally dedicated to receiving the identifiers (specifically the IP addresses) of neighboring network elements directly connected to the network element issuing the identification message and informing said elements that the issuing network element is active (these messages are known as "HELLO" packets in the OSPF protocol); and routing table update messages, which messages normally contain the identifiers of the network elements to which the message-issuing network element knows it is connected either directly or indirectly (these messages are known as link state messages LSA, LSU, or LSR in the OSPF protocol). These identifiers are the network addresses of said network elements, which network addresses are associated with network ranges.

The protection and routing devices 6 are configured:

to issue to the routing devices 19 identification messages having respective neighborhood identification fields containing the identifiers of the network elements to which the protection and routing device knows it is connected either directly or indirectly, i.e. the network addresses: of the interfaces 9 (where the interfaces 9 have the same address as the associated interfaces 10; it should be observed that two interfaces that are connected together have the same network address and that this address is mentioned once only); of the interfaces 12 (if the protection and routing device 6 in question is connected to the selection device 7); of the interfaces 13, 14, or 15 (depending on whether the protection and routing device 6 in question is connected to the routing device 19a or 19b; the network addresses of the interfaces 14 and 15 being the same as the addresses of the interfaces 17 and 18, respectively); and of the interface 16, and the network address of the network 4;

to process the identification messages received from the routing devices 19 merely as being indicative that the routing devices 19 are active.

Thus, the neighborhood identification field issued by the protection and routing device 6a contains:

the addresses of the networks: to which the interfaces 9 and 12 belong (since the protection routing device 6a is connected to the selector device 7); to which the interfaces 13 and 14 belong (the protection and routing device 6a having a priority connection to the interface 17 of the routing device 19a; if the protection and routing device 6a receives identification messages only from the routing device 19b, then the network address of the interface 15 of that device would be given); and to which the interface 16 belongs; and the network address of the network 4.

The neighborhood identification field issued by the protection and routing device 6b contains the network addresses of the interface 16 and of the interfaces 9, 13, and 14 (the protection and routing device 16 being connected on a priority basis to the interface 17 of the routing device 19b).

Since the protection and routing device 6b is not connected by the selector device 7 to the network 4, its interface 12 is not active, so the network address of the network 4 and the network address of the interface 12 do not appear in the neighborhood identification field. Thus, the routing device 19a is informed as to which protection and routing device 6 is connected to the network 4.

The routing devices 19 are configured:
  to update their routing tables from the identification messages received from the protection routing devices 6;
  not to issue routing table update messages to the protection and routing devices 6; and
  to exchange identification messages and update messages in conventional manner with the other network elements 3 that perform a routing function.

Each routing device 19 needs to contain in its memory a static correspondence table matching the network addresses that appear in the neighborhood identification fields of the identification messages from the protection and routing devices 6 with the network ranges of said addresses, which information cannot be conveyed in the neighborhood identification field of an identification message. To ensure that the OSPF protocol operates properly, it is also necessary for each route to be stored in association with a weight in this static correspondence table. Since only one route is possible for reaching the network 4, the weight is determined arbitrarily, and in this case is equal to 1.

It should be observed that the network 4 is globally identified in the neighborhood identification fields of the identification messages issued by the protection and routing devices 6. This makes it possible to avoid the protection and routing devices 6 transmitting information about the topography of the network 4 over the network 2.

The composition of the network 4 is thus kept secret from the network 2. This improves the security of the network 4.

Naturally, the invention is not limited to the implementation described and variations can be applied thereto without going beyond the ambit of the invention as defined by the claims.

In particular, the configuration of the network could be different from that shown, and it could include other quantities of protection and routing devices 6 and/or of routing devices 19.

The selector device may be an electrical switch connected to the links between the network 4 and the protection and routing devices 6, or else selection can be the result of allocating an address to only one of the protection and routing devices 6.

The protection and routing devices 6 can be connected to the network 4 via a proxy server which in addition to verifying the content of data streams, also serves to perform protocol conversion in the event of the two networks not using the same communications protocols.

What is claimed is:

1. A method of exchanging information between a first network and a second network, each made up of network elements, comprising:
  connecting the first and second networks, which are different from each other, the first network being a secure avionics network and the second network being a public network, which together form an on-board network for an aircraft, to each other via at least two first routing elements that are selectively associated with the first network, and by at least one second routing element that is associated with the second network and that is connected to the first routing elements;
  the first network implementing a routing protocol using static routing tables;
  the second network implementing a routing protocol using dynamic routing tables and including a stage of exchanging identification messages each having a neighborhood identification field normally dedicated to receiving the identifiers of neighboring network elements directly connected to the network element issuing the identification message and informing the neighboring network elements that the issuing network element is active, and a stage of exchanging routing table update messages, which update messages normally contain the identifiers of network elements to which the message-issuing network element knows it is connected either directly or indirectly;
  each first routing element issuing to the second routing element identification messages each having a neighborhood identification field containing the identifiers of network elements to which the first routing element knows it is connected directly or indirectly;
  in each first routing element, processing the identification messages coming from the second routing element solely as indicating that the second routing element is active; and
  in the second routing element, updating the routing table from the identification messages coming from the first routing element.

2. The method according to claim 1, wherein the second routing element is configured not to issue update messages to the first routing element.

3. The method according to claim 1, wherein the first network is identified globally in the neighborhood identification fields of the identification messages issued by the first routing element that is actually associated with the first network.

4. The method according to claim 1, wherein the routing elements are between the first and second networks and not part of either network.

5. An aircraft having an on-board network comprising an avionics network and a public network, each made up of network elements, and connected to each other via at least two first routing elements that are selectively associated with the avionics network, and by at least one second routing element that is associated with the public network and that is connected to the first routing elements, the avionics network implementing a routing protocol using static routing tables, and the public network implementing a routing protocol using dynamic routing tables and including a stage of exchanging identification messages each having a neighborhood identification field normally dedicated to receiving the identifiers of neighboring network elements directly connected to the network element issuing the identification message and informing the neighboring network elements that the issuing network element is active, and a stage of exchanging routing table update messages, which update messages normally contain the identifiers of network elements to which the message-issuing network element knows it is connected either directly or indirectly, wherein:
  each first routing element is configured for issuing to the second routing element identification messages each having a neighborhood identification field containing the identifiers of network elements to which the first routing element knows it is connected directly or indirectly;
  each first routing element is configured for processing the identification messages coming from the second routing element solely as indicating that the second routing element is active; and
  the second routing element is configured for updating its routing table from the identification messages coming from the first routing element.

6. The aircraft according to claim 5, wherein the second routing element is configured not to issue update messages to the first routing element.

7. The aircraft according to claim 5, wherein the avionics network is identified globally in the neighborhood identification fields of the identification messages issued by the first routing element that is actually associated with the avionics network.

* * * * *